United States Patent [19]

Bickle et al.

[11] Patent Number: 4,666,787
[45] Date of Patent: May 19, 1987

[54] MATERIAL FOR SLIDING SURFACE BEARINGS

[75] Inventors: Wolfgang Bickle, Reilingen; Jürgen Braus, Walldorf; Hans-Paul Baureis, Dielheim Horrenberg, all of Fed. Rep. of Germany

[73] Assignee: Kolbenschmidt Aktiengesellschaft, Neckarsulm, Fed. Rep. of Germany

[21] Appl. No.: 830,296

[22] Filed: Feb. 14, 1986

[30] Foreign Application Priority Data

Feb. 16, 1985 [DE] Fed. Rep. of Germany ....... 3505374

[51] Int. Cl.⁴ .................................................. B22F 3/10
[52] U.S. Cl. ...................................... 428/550; 252/12; 252/12.2; 384/908; 384/912; 419/9; 419/23; 419/27; 419/28; 419/29; 419/43; 419/54; 419/55; 427/34; 427/214; 427/216; 427/217; 427/220; 427/405; 427/409; 428/551; 428/626; 428/653; 428/677; 428/681; 428/668; 428/686; 428/908.8

[58] Field of Search ............... 428/551, 550, 668, 653, 428/626, 908.8, 677, 681, 686; 252/12, 12.2; 384/908, 912; 427/34, 214, 216, 217, 220, 405, 409; 419/9, 23, 27, 28, 29, 43, 54, 55

[56] References Cited

U.S. PATENT DOCUMENTS

| | | | |
|---|---|---|---|
| 3,883,314 | 5/1975 | Schnyder | 419/27 |
| 4,000,982 | 1/1977 | Veda | 428/551 |
| 4,200,541 | 4/1980 | Kinner | 428/613 |
| 4,208,472 | 6/1980 | Cho et al. | 428/550 |
| 4,268,467 | 5/1981 | Wagner | 419/24 |
| 4,439,484 | 3/1984 | Mori | 428/461 |

Primary Examiner—Stephen J. Lechert, Jr.
Attorney, Agent, or Firm—Sprung Horn Kramer & Woods

[57] ABSTRACT

A material which is intended for use in sliding surface bearings comprises a metallic backing, a porous metallic substrate layer applied to said backing, and a PTFE-filler mixture, which completely fills the pores of the substrate layer and constitutes an antifriction layer. The bond strength between the antifriction layer and the substrate layer is improved by coating that surface of the substrate layer which faces the antifriction layer with a primer.

3 Claims, 1 Drawing Figure

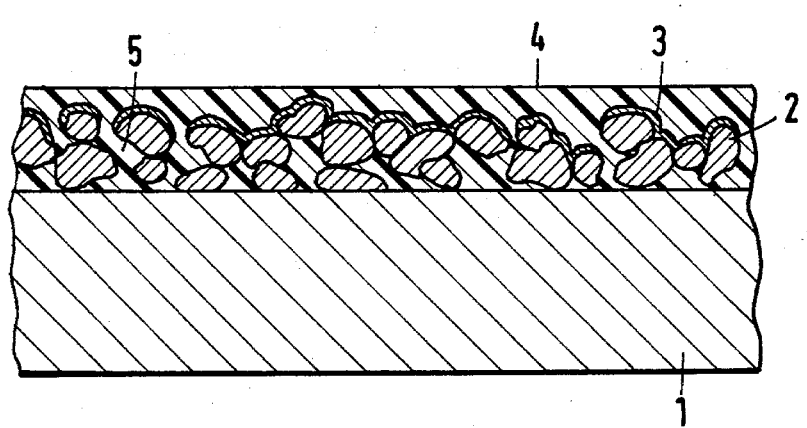

MATERIAL FOR SLIDING SURFACE BEARINGS

BACKGROUND OF THE INVENTION

This invention relates to a material for sliding surface bearings, which material comprises a metallic backing having a thickness of 0.5 to 2.5 mm and consisting preferably of steel, bronze or a high-strength aluminum alloy, a porous substrate layer having a thickness of 0.2 to 0.4 mm and consisting of tin bronze, tin-lead bronze or an aluminum bearing alloy and applied to said backing, a mixture of polytetrafluorethylene (PTFE) and 15 to 25% by volume of a filler for improving the thermal conductivity and wear resistance and completely filling the pores of said substrate layer, and an antifriction layer having a substrate layer, and an antifriction layer having a thickness of 0.01 to 0.03 mm and consisting of the PTFE-filler mixture and provided on said substrate layer.

Such a composite described, e.g., in VDI-Z. 110 (1968), No. 15, pages 632-636, permits a full utilization of the special properties of PTFE, namely, low coefficient of friction, nonaggressive behaviour, high thermostability from $-200°$ to $+280°$ C. and high chemical stability, whereas its less desirable properties do not affect the properties of the bearing. PTFE has a relatively low strength, a high thermal expansion and a low thermal conductivity. These disadvantages are rendered ineffective by the metallic backing and the sinter-bonded porous substrate. Owing to the presence of the backing and of the substrate layer, the material for sliding surface bearings has a compressive strength of 360 $N/mm^2$ and in expansion behavior is similar to steel. The substrate layer lubricates the PTFE and ensures a high dissipation of heat from the bearing gap. The mixture of PTFE and lead acts like a permanent or solid lubricant. The material for sliding surface bearings can be used without any lubricant for pv values of 1.8 $N/mm^2$ in continuous operation and, up to 3.6 $N/mm^2$ in intermittent operation. When the above-mentioned pv capacities are fully utilized during a dry running of the bearing, a sliding speed of $v=2$ mm/sec. should not be exceeded. When the bearing has been completely run in, the wear to a depth of about 0.04 to 0.05 mm is proportional to the pv value so that the life of the material for sliding surface bearings will be inversely proportional to the pv factor.

Owing to the properties described hereinbefore, the material for sliding surface bearings can be used for a multitude of purposes. For instance, in mechanical engineering, it is no longer required in many cases to provide conventional lubricating systems, which are often highly expensive. The dry running of the bearings improves their safety in operation because there is no need for a servicing by a supply of additional lubricant. But a disadvantage resides in the fact that the bearing elements made from that maintenance-free material for sliding surface bearings cannot be used in a lubricant-containing environment, e.g., in shock absorbers, hydraulic pumps or the like, where they are subjected to alternating loads so that the bearing surface and the surface in contact therewith are often separated from each other; because under such conditions the lubricants effect an erosion of the PTFE-lead mixture as a result of cavitation.

SUMMARY OF THE INVENTION

For this reason it is an object of the present invention to improve the material for sliding surface bearings which has been described first hereinbefore, so that the bearing elements made of such material can be used also in sliding surface bearings which are subjected to alternating loads in the presence of lubricant.

This object is accomplished in that that surface of the substrate layer which faces the antifriction layer is coated with a primer layer in a thickness of 2 to 10 $\mu m$. That feature improves the bond between the sliding layer consisting of the PTFE-filler mixture and the substrate layer but also reduces the wear.

In accordance with a preferred feature of the invention, the primer layer consists of chromium phosphate or substances having similar properties and of embedded PTFE particles, which are sinter-bonded to adjacent PTFE particles of the antifriction layer during the sintering of the PTFE-filler mixture.

In the process of producing the material, in accordance with the invention, for sliding surface bearings, a porous metallic substrate layer is applied to a metallic backing, e.g., by a sintering of a metallic powder having a particle size of 80 to 200 $\mu m$ at a temperature of 800° to 850° C. or by plasma coating, immediately thereafter a mixture consisting of 90 to 110 parts PTFE dispersion, 10 to 30 parts chromium phosphate and 20 to 50 parts distilled water is applied to the substrate layer and dried at 265° to 300° C., and the PTFE-filler mixture is then applied by rolling and is sintered at 390° to 410° C.

The advantage afforded by the invention resides particularly in that the bond strength between the antifriction layer consisting of the PTFE filler mixture and the substrate layer has been increased from the conventional values in the range from 3.5 to 4.5 $N/mm^2$ to a bond strength in the range from 6.5 to 7.5 $N/mm^2$ and the wear has been reduced from the conventional value of 0.54 $\mu m/km$ to a wear of 0.38 $\mu m/km$.

BRIEF DESCRIPTION OF THE DRAWING

The invention will now be explained more in detail and by way of example with reference to the FIGURE which is a transverse sectional view of the material for sliding surface bearings according to the present invention.

DETAILED DESCRIPTION OF THE INVENTION

A bearing bushing comprises a steel backing 1, to which a porous substrate layer 2 consisting of modular bronze powder (composed of 80% by weight Cu, 10% by weight Pb, 10% by weight Sn) has been sinter-bonded. The bronze layer 2 has an average porosity of 30% and its pores are filled with a mixture 5 of 80% PTFE and 20% lead powder in such a manner that the PTFE-lead mixture also constitutes an antifriction layer 4 in a thickness of about 25 $\mu m$ over the peaks of the bronze layer. On that surface which faces the antifriction layer, the bronze layer 2 is coated in a thickness of 2 to 5 $\mu m$ with a primer layer 3 consisting of chromium phosphate and PTFE particles embedded therein.

The material is produced by a process wherein the porous metallic substrate layer 2 is applied to metallic backing 1 by a sintering of metallic powder having a particle size of 80 to 200 $\mu m$ at a temperature of 800° to 850° C. or by plasma coating. Immediately thereafter, primer mixture 3 consisting of 90 to 110 parts PTFE dispersion, 10 to 30 parts chromium phosphate and 20 to 50 parts distilled water is applied to layer 2 and dried at 265° to 300° C. and the PTFE filler-mixture 5 is then applied by rolling and is sintered at 390° to 410° C.

It will be appreciated that the instant specification and claims are set forth by way of illustration and not limitation, and that various modifications and changes may be made without departing from the spirit and scope of the present invention.

What is claimed is:

1. In a material for sliding surface bearings, where in the material comprises a metallic backing having a thickness of 0.5 to 2.5 mm and consisting of one of steel, bronze and a high-strength aluminum alloy, a porous substrate layer applied to the backing and having a thickness of 0.2 to 0.4 mm and consisting of one of tin bronze, tin-lead bronze and an aluminum bearing alloy, a mixture of polytetrafluoroethylene (PTFE) and 15 to 25% by volume of a filler for improving the thermal conductivity and wear resistance and completely filling the pores of said substrate layer, and an antifriction layer having a thickness of 0.01 to 0.03 mm and consisting of the PTFE-filler mixture and provided on said substrate layer, the improvement wherein: the surface of the substrate layer which faces the antifriction layer is coated with a primer layer in a thickness of 2 to 10 μm to improve the bond between the antifriction layer and the substrate layer while reducing the wear.

2. The material for sliding surface bearings according to claim 1, wherein the primer layer consists of chromium phosphate and of embedded polytetrafluoroethylene particles.

3. A process of manufacturing a material for sliding surface bearings, comprising: applying a porous metallic substrate layer to a metallic backing by one of sintering of a metallic powder having a particle size of 80 to 200 μm at a temperature of 800° to 850° C. or by plasma coating, immediately thereafter applying a mixture consisting of 90 to 110 parts polytetrafluoroethylene dispersion, 10 to 30 parts chromium phosphate and 20 to 50 parts distilled water to the substrate layer and drying same at 265° to 300° C., and applying a PTFE-filler mixture by rolling and sintering at 390° to 410° C.

* * * * *